United States Patent [19]

Ohara

[11] 4,346,401
[45] Aug. 24, 1982

[54] REPRODUCING A COLOR IMAGE ON A PHOTOSENSITIVE MATERIAL IN RESPONSE TO AN ELEMENT-SEQUENTIAL COLOR SIGNAL

[75] Inventor: Yuji Ohara, Asaka, Japan

[73] Assignee: Fuji Photo Film Co., Ltd., Minami-ashigara, Japan

[21] Appl. No.: 145,242

[22] Filed: Apr. 30, 1980

[30] Foreign Application Priority Data

May 1, 1979 [JP] Japan .................. 54-53630

[51] Int. Cl.³ .............................. H04N 1/46
[52] U.S. Cl. ................................... 358/75
[58] Field of Search .................. 358/75, 78, 44, 80

[56] References Cited

U.S. PATENT DOCUMENTS

| | | | |
|---|---|---|---|
| 4,107,733 | 8/1978 | Schickedanz | 358/75 |
| 4,153,912 | 5/1979 | Gold | 358/44 |
| 4,161,749 | 7/1979 | Erlichman | 358/75 |
| 4,176,373 | 11/1979 | Dillon et al. | 358/12 |

OTHER PUBLICATIONS

Radio Shack, *Dictionary of Electronics,* 1974–1975 edition, p. 297.

*Primary Examiner*—John C. Martin
*Attorney, Agent, or Firm*—Fleit & Jacobson

[57] ABSTRACT

An electric signal obtained by two-dimensionally scanning a color original image through a micro-color filter is processed to be adapted for recording a color image on a subtractive color photosensitive material. The electric signal contains signal components for three primary colors in time series. The electric signal is first converted to a digital signal by use of an A/D converter and then divided into three signals for the three colors. Each signal of different color is processed to have signal sections in which every section of the signal is based on the level of the adjacent section of the signal, each section corresponding to the picture element of the original color image. Then, the three signals are D/A converted to an analog signal, which is used for recording a color image on a subtractive photosensitive material.

12 Claims, 12 Drawing Figures

REPRODUCING A COLOR IMAGE ON A PHOTOSENSITIVE MATERIAL IN RESPONSE TO AN ELEMENT-SEQUENTIAL COLOR SIGNAL

BACKGROUND OF THE INVENTION

1. Field of the Invention

This invention relates to a method and system for reproducing a color image from a color image signal, and more particularly to a method and system for obtaining a high quality color image from a color image signal that is obtained by two-dimensionally scanning a color image. The present invention further pertains to a color image reproduction system in which a color image signal is first obtained by scanning a color image through a color filter having a stripe or mosaic pattern and then the color image signal thus obtained is digitally processed.

2. Description of the Prior Art

It has been known in the art to obtain a time series signal of an input image information of a color image by two-dimensionally scanning the color input image with an image pick up device through a micro-color filter having a stripe or mosaic pattern for color separation. For instance, such techniques are described in "Nikkei Electronics" Nov. 4, 1974, pages 58-83 and in "Nikkei Electronics" Sept. 18, 1978, pages 74-89 in which the above mentioned color image recording system is described in connection with a television camera. Further, the micro-color filter can be used for a color facsimile and a color scanner.

Now, several examples of the above-mentioned system, in which the micro-color filter is applied to a facsimile or a color scanner, will be described in detail with reference to the accompanying drawings of FIGS. 1, 2 and 3.

FIG. 1 schematically shows a single plate type image pick up device using a two-dimensional solid image sensor. Referring to FIG. 1, the light 2 from an object 1 is converged by a lens 3 and focused on a stripe type micro-color filter 4. The image of the object 1 focused on the micro-color filter 4 is then focused on a two-dimensional solid image sensor 6 by use of a relay lens 5. The stripe type micro-color filter 4 is a multi-color filter in which fine stripe filters of red, green and blue (hereinafter referred to as R, G and B) each extending in Y-direction are arranged in X-direction regularly. The two-dimensional solid image sensor 6 is a multi-element sensor in which photosensitive elements of the same size are arranged regularly in X- and Y-directions in a matrix and the output of the elements is self-scanned in X-direction as the primary scanning and in Y-direction as the secondary scanning to obtain a time series signal representing the two dimensional image. The pitch of arrangement in X-direction of the stripe type micro-filter 4 is in proportion to the pitch of arrangement in the same direction of the photosensitive elements of the solid image sensor 6.

With the above arrangement, the information of the color image carried by the object 1 is divided into R, G and B information by color separation through the micro-color filter 4 and converted to a time series electric signal 7 by means of the solid image sensor 6. The electric signal 7 thus obtained is schematically shown in FIG. 1. This signal 7 is composed of a series of R, G and B information segments arranged in time series alternately. Each of the three color information segments corresponds to one picture element covered by a single sensor element.

FIG. 2 schematically shows a plane scanning type color facsimile transmitter in which a micro-color filter is employed. Referring to FIG. 2, an original image 11 is illuminated by a white light source 12. The light reflected by the surface of the original image 11 is focused on a one-dimensional solid image sensor 16 by way of a mirror 13, a lens 14 and a micro-color filter 15. The micro-color filter 15 is in contact with the surface of the solid image sensor 16. In this example also, the micro-color filter 15 consists of a number of stripe color filters of R, G and B arranged in X-direction regularly. The pitch in which the stripes of R, G and B filter are arranged is made equal to the pitch in which the sensor elements of the solid image sensor 16 are arranged. Both the stripes and the sensor elements are arranged in X-direction. The original image 11 is moved in Y-direction. The original image 11 is scanned by primary scanning in X-direction and by secondary scanning in Y-direction. In this example also, the electric signal 17 output from the solid image sensor 16 is a time series signal composed of three color information of R, G and B arranged in series alternately.

FIG. 3 schematically shows an image read-out part of a color scanner in which a micro-color filter is employed. Referring to FIG. 3, an original image 21 is wound up on a rotatable cylinder 22 and further thereon is wound up a stripe type micro-color filter 23. The micro-color filter 23 is of the same type as that shown in FIG. 1 and mounted on the cylinder 22 with the lengthwise direction of the stripes oriented in parallel to the axis of rotation of the cylinder 22. In FIG. 3, the light 25 from a white light source 24 is focused by a lens 26 on the stripe type micro-color filter 23 and the original image 21 and is reflected by the surface thereof. The reflected light is converted to an electric signal 28 by a photo-electric conversion element or a photosensor 27. The optical system composed of the light source 24, lens 26 and photosensor 27 are moved together along the surface of the cylinder 22 keeping their mutual relationship of position fixed. Thus, the original image 21 is scanned in Y-direction as the secondary scanning. As the primary scanning, the rotatable cylinder 22 is rotated in X-direction. In this example also, the electric signal 28 from the photosensor 27 is composed of a series of three color information of R, G and B alternately arranged in series like the above two examples shown in FIGS. 1 and 2.

SUMMARY OF THE INVENTION

The object of the present invention is to provide a method and system for obtaining a high quality reproduced image of a color original image by use of the time series color image signal obtained as mentioned above.

A more specific object of the present invention is to provide a method and system for reproducing a high quality image of a color original on a photosensitive material by use of an electric signal.

The method and system for reproducing a color image of this invention is characterized in that the color signals of R, G and B sequentially included in one electric signal are modified to include the adjacent color signals of other colors and are used to reproduce a color image on a photosensitive material of subtractive color type. That is, the method of reproducing a color image of an original image is not used in a color television system but is used to record a color image on a photosensitive material like a color film for photographic use. In recording the color image on the photosensitive material, all the three colors are used for every spot on the material. In other words, differently from the color television system, every spot or area of the color photosensitive material is able to carry three color components whereas in the color television system every spot is only able to carry one color component. Therefore, the color image signal carrying the three color component information in time series is modified to carry the three color component information in parallel. In order to make the color signal having the three color components in parallel from the color signal having the three color components in series, every color component information carried by a part or one third of the full part of the electric signal corresponding to one picture element is modified or processed to include the color component information of the other two color components adjacent thereto. In this signal processing system for reproducing a color image on the subtractive color photosensitive material, the signal is subjected to digital processing.

DESCRIPTION OF THE PREFERRED EMBODIMENTS

Now the present invention will be described in detail with reference to the preferred embodiments thereof referring to the accompanying drawings.

Figure 1:
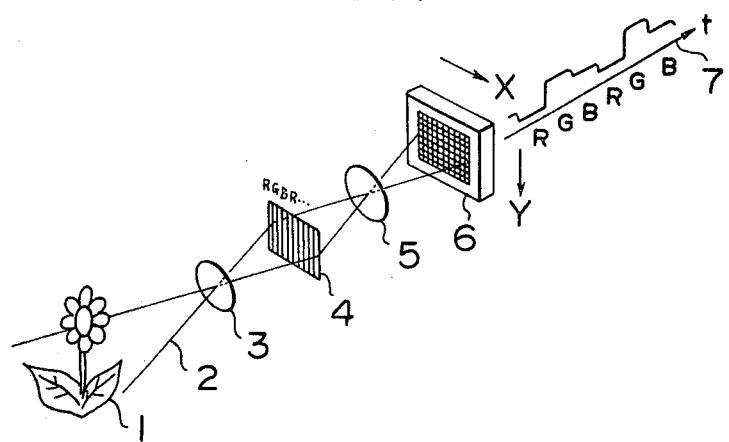
FIGS. 1 to 3 are schematic illustrations showing examples of a two-dimensional image scanning system in which a color image information is taken out in a time series signal by use of a color separating micro-color filter.
Figure 2:
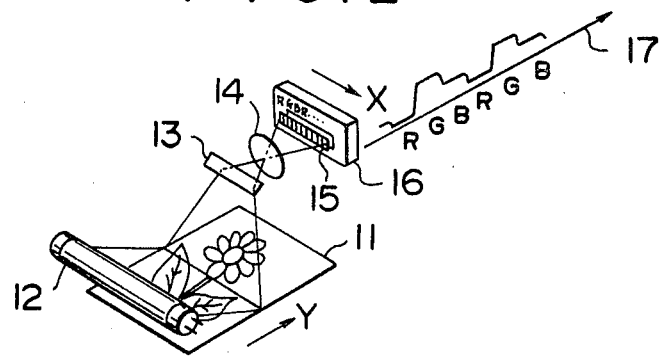
Figure 3:
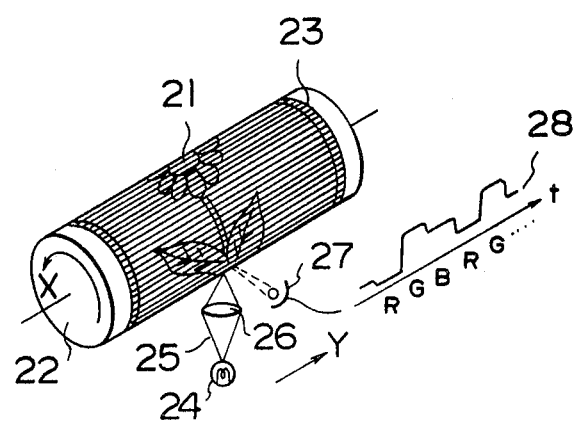
Figure 4:
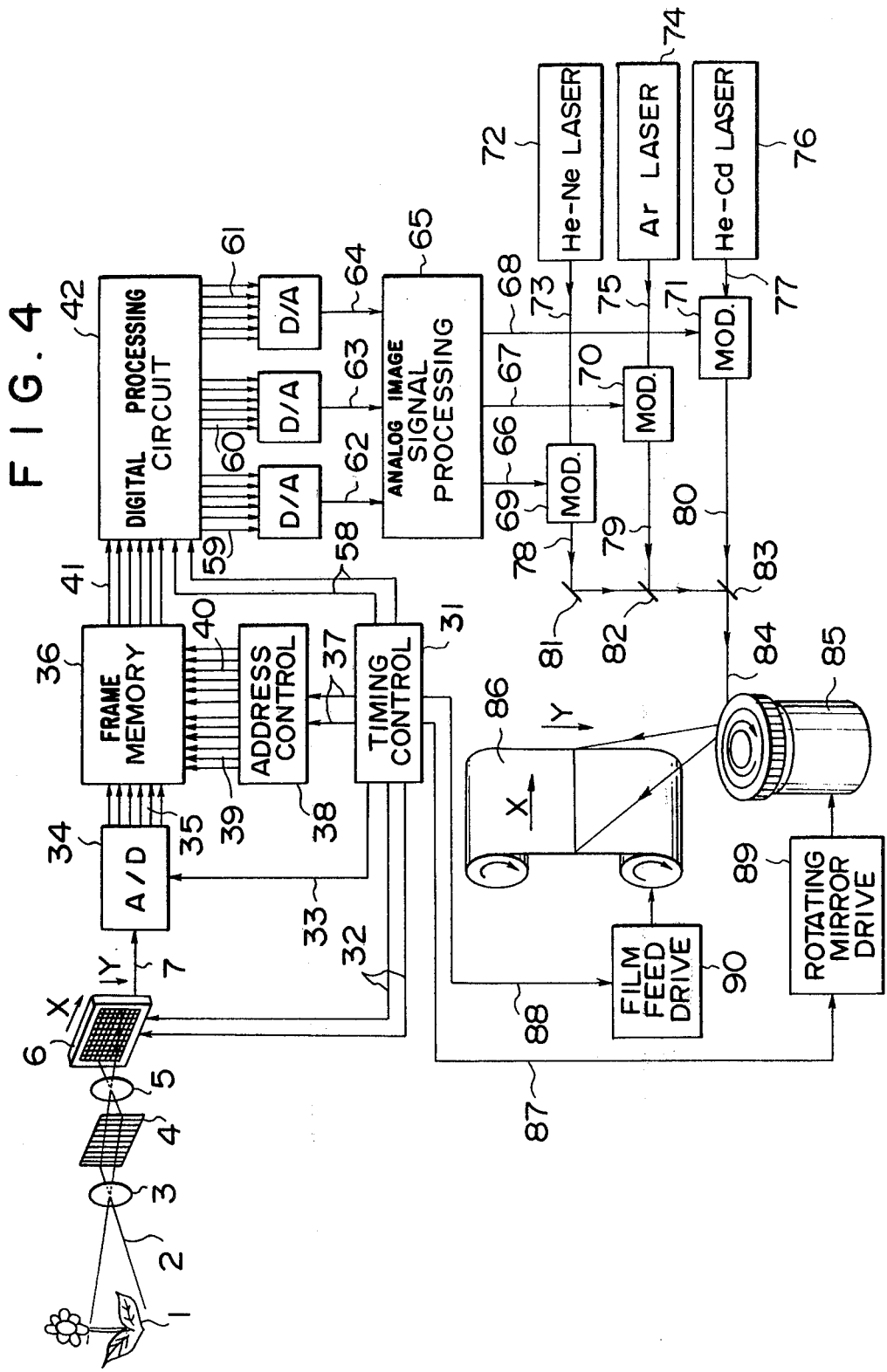
FIG. 4 is a block diagram showing an example of a color image reproduction system for carrying out the method of this invention.
Figure 5:
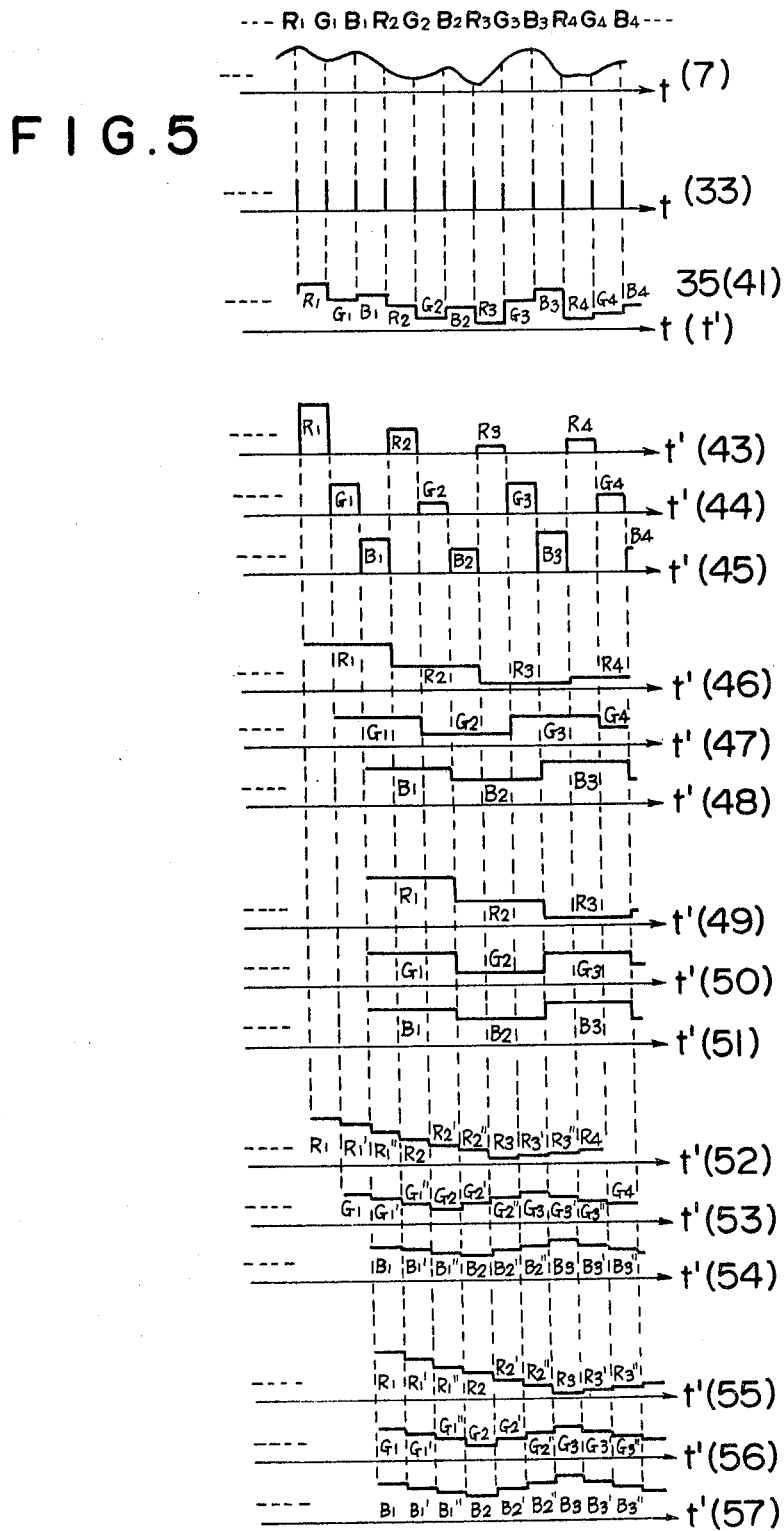
FIG. 5 is a diagram for explaining the conversion or processing of the color image signal used in this invention.

FIG. 4 shows an example of the color image reproduction system in which the two-dimensional image scanning system as shown in FIG. 1 is employed in the present invention. An image of an object 1 is focused on a stripe type micro-color filter 4 by a focusing lens 3 and is further focused on a solid image sensor 6. The solid image sensor 6 comprises a number of sensor elements arranged in a matrix as mentioned with reference to FIG. 1. The solid sensor 6 can be implemented by using for instance CCD211 or CCD221 made by Fairchild Industries Inc. The reference numerals attached to those elements as shown in FIG. 4 are all the same as those used in FIG. 1. The solid image sensor 6 outputs an electric signal 7 representing the information of the color image of the object 1 focused thereon according to the clock pulse series 32 given by a timing control circuit 31. The electric signal 7 has, as shown in FIG. 5, R-brightness information, G-brightness information and B-brightness information sequentially included in time series along the axis of time t for every picture element of the object 1. The three color components of the brightness information are arranged in the same order as that of the R, G and B stripes of the stripe type micro-color filter 4. The color components of course correspond to the sensor elements of the solid image sensor 6. In FIG. 5, the color brightness information components of the electric signal 7 are designated as R1, G1, B1, R2, G2, B2, R3, G3, B3, . . . The electric signal 7 thus obtained is converted to a digital signal 35 of 6 bits by an A/D converter 34 according to the timing provided by a clamp pulse series 33 from the timing control circuit 31, and then is memorized in a frame memory 36. The frame memory 36 memorizes the digital signal 35 at the addresses designated by an X-address signal 39 and a Y-address signal 40 outputted by an address control circuit 38 according to the clock pulse series 37 from the timing control circuit 31. The clock pulse series 32, the clamp pulse series 33, the clock pulse series 37, the X-address signal 39 and the Y-address signal 40 are all synchronized with each other. Further, the X-Y arrangement of the picture elements in the solid image sensor 6 are made to correspond to the addresses in the frame memory 36. The digital signal for the picture elements stored in the frame memory 36 is sequentially read out in the order of the addressed designated by the X-address signal 39 and the Y-address signal 40 outputted from the address control circuit 38 according to the clock pulse series 37 from the timing control circuit 31. At this stage, the pulse interval of the clock pulse series 37 is normally changed from the pulse interval adopted when the digital signal 35 is inputted into the frame memory 36 so that the information recording on the photosensitive material may be conducted with a proper spatial frequency. Therefore, the digital signal 41 read out from the frame memory 36 exactly corresponds to the digital signal 35 with only the time scale changed. The digital signal 41 thus obtained is sent to a digital processing circuit 42. The processing circuit 42 is made of various types of digital IC circuitry according to the type of the signal processing to be performed. Some of the examples thereof will be described hereinbelow. In the processing circuit 42, the digital signal 41 is separated by use of a demultiplexer into an R-digital signal 43 carrying only the brightness information of R, a G-digital signal 44 carrying only the brightness information of G, and a B-digital signal 45 carrying only the brightness information of B. The signal which has only been separated for each color is not proper for recording on a subtractive color photosensitive material for the reason as mentioned hereinafter. Then, the separated digital signals 43, 44 and 45 are simply processed by a latch circuit to provide filled in signals 46, 47 and 48 as shown in FIG. 5 so that the signal may be used for recording a color image on the subtractive color photosensitive material. In case it is desired to reproduce the image for every picture element as a unit in which only one R, one G and one B components are included, it is necessary to align the boundaries of the adjacent signal components with each other between different colors as shown in FIG. 5 at signals 49, 50 and 51. In order to obtain the signals aligned in this way, the digital signals 46, 47 and 48 are processed by a latch circuit to make the digital signals 49, 50 and 51. On the other hand, when it is desired to obtain a color image reproduced in which the boundaries between adjacent picture elements are not clear and the image provides a soft appearance, the signals are processed by calculating the weighted mean as shown in FIGS. 5 at 52, 53 and 54 or 55, 56 and 57. These digital signals may be obtained from said digital signals 43, 44 and 45 or 46, 47 and 48, or 49, 50 and 51 by use of adders and phase shifters. It is also possible to obtain these signals from said signals by use of a micro-computer. The processing by the circuit 42 is controlled by the clock pulse series 58 from the timing control circuit 31.

The digital signals 59, 60 and 61 obtained for R, G and B as the output of the circuit 42 are converted to analog signals 62, 63 and 64 by D/A converters and put into an analog image signal processing circuit 65. In the analog image signal processing circuit 65 the analog signals 62, 63 and 64 for R, G and B are passed through a log-converter and converted to signals of log function. The log-converted signals are subjected to compensation in view of the characteristic of the photosensitive material used for recording the image. Thus, gradation compensation and matrix compensation are conducted on the log-converted signals. Further, in case that the photosensitive material is of negative type, the signals are negative-positive reversed. Thereafter, the signals are converted back again to the linear signals by an inverse-log converter. Thus, analog signals 66, 67 and 68 are outputted from the signal processing circuit 65. These signals 66, 67 and 68 for R, G and B are forwarded to the respective light modulators 69, 70 and 71 for modulating the laser beams passing therethrough. The modulator 69 for R-signal 66 modulates the laser beam 73 emitted by a He-Ne laser source 72, the modulator 70 for G-signal 67 modulates the laser beam 75 emitted by an Ar laser 74, and the modulator 71 for B-signal 68 modulates the laser beam 77 emitted by a He-Cd laser source 76. The laser beams 73, 75 and 77 are amplitude modulated by the intensity of the analog signals 66, 67 and 68. The modulated laser beams 78, 79 and 80 for R, G and B are composed into a composite light beam 84 by means of a mirror 81 and dichroic mirrors 82 and 83 are guided to a rotating polygonal mirror 85. The composite light beam 84 is deflected by the rotating polygonal mirror 85 and caused to scan a photosensitive material 86 to record information thereon in X-direction. The photosensitive material 86 is moved in Y-direction perpendicular to the direction of scanning. It will be noted that the control pulse series 87 and 88 from the timing control circuit 31 are given to a polygonal mirror driving circuit 89 and a photosensitive material feeding mechanism driving circuit 90, respectively, so that the arrangement of the picture elements in the input color image may be reproduced on the photosensitive material in the two-dimensional way.

Thus, the two-dimensional color image of the object 1 is reproduced on the photosensitive material 86 by use of the color image signals representing the input color image. The image reproduced on the photosensitive material 86 is a latent image and developed into a visible image through chemical processes of development and fixing. The processing of the photosensitive material 86 will hereinbelow be described in detail referring the accompanying drawings.

Figure 6:
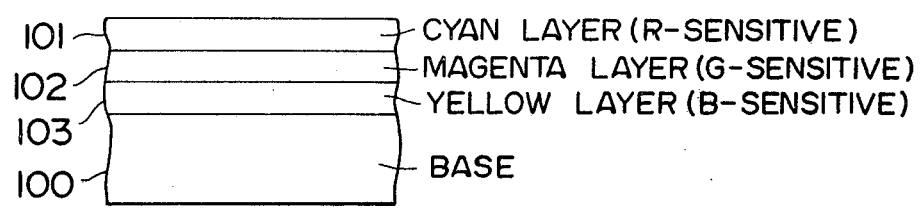
FIG. 6 is a cross-sectional view showing a part of the color photosensitive material to be used in the present invention.
Figure 7:
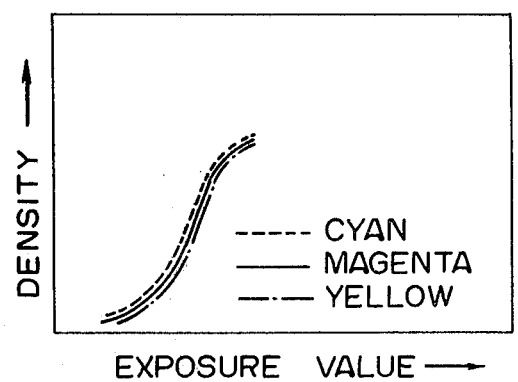
FIG. 7 is a graph showing the characteristic curve of an example of the color photosensitive material.

The photosensitive material 86 of the subtractive color type used in this invetion is a negative type color paper or color film composed of a base support 100 and three photosensitive layers 101, 102 and 103 disposed thereon. As shown in FIG. 6, on the base support 100 are disposed a cyan layer 101 sensitive to R-light, a magenta layer 102 sensitive to G-light and a yellow layer 103 sensitive to B-light. The characteristic curves of the three photosensitive layers 101 to 103 are as shown in FIG. 7.

Figure 8A:
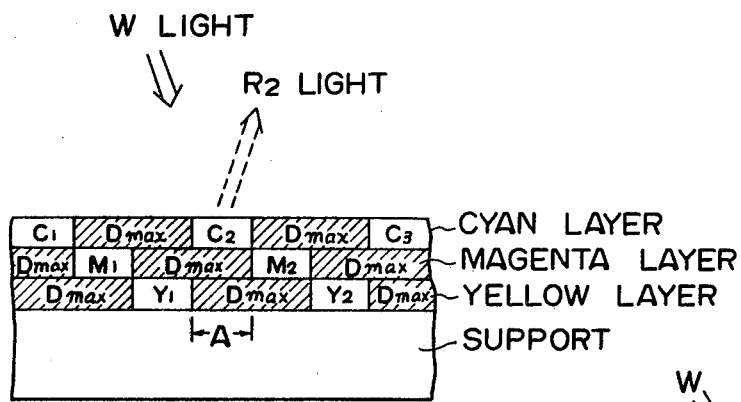
FIGS. 8A to 8E are cross-sectional views showing the examples of coloring of the photosensitive layers of a subtractive color photosensitive material.

FIGS. 8A to 8E show the coloring of the photosensitive layers of the subtractive color photosensitive material 86 colored by the digital signals 43 to 57 as shown in FIG. 5. FIG. 8A shows the coloring of the layers colored by the digital signals 43, 44 and 45. In FIGS. 8A to 8E, it is assumed that the recorded color image is viewed under white illumination. In this example shown in FIG. 8A, in the area indicated by A, cyan is colored at C2 based on the level of the signal R2 of the digital signal 43. However, the level of the signal at the same instance for G and B is zero, and accordingly, the level of the signal is outputted as the maximum level by the negative-positive reversing circuit. Accordingly, the density of these layers is made maximum Dmax by exposure thereof to the maximum level of G-light and B-light. Thus, the magenta layer and the yellow layer are colored with the highest density. The color image thus recorded on the photosensitive material 86 becomes the same as the color image focused on the solid image sensor 6 in FIG. 4 which is composed of color stripes of R, G and B as viewed through the micro-color filter 4. The image thus obtained has the stripe pattern and accordingly cannot be evaluated as a high quality image.

Figure 8B:
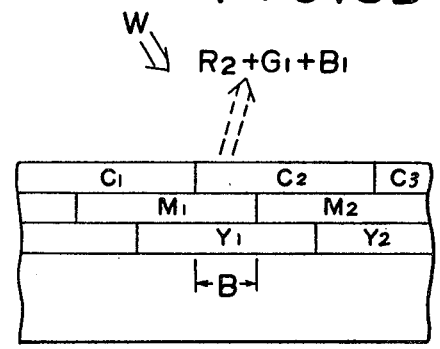

FIG. 8B shows an example in which the digital signals 46, 47 and 48 are used for recording a color image on the photosensitive material 86. In this case, the digital signals 46–48 are processed and accordingly at the area B all the layers are colored. In other words, the cyan layer is colored according to the signal level of R2 of the digital signal 46 in the density C2, the magenta layer is colored in M1 according to the signal level of G1, and the yellow layer is colored in Y1 according to the signal level of B1. Thus, in the recorded image obtained in this example there is not seen the stripes as seen in FIG. 8A and a color image faithful to the input object 1 can be reproduced.

Figure 8C:
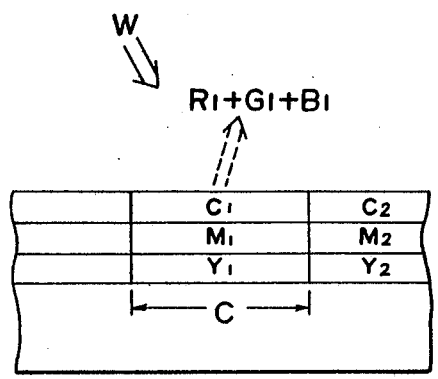

FIG. 8C shows an example in which the digital signals 49, 50 and 51 are used for recording a color image on the photosensitive material 86. In this example, the three layers are all colored into C1, M1 and Y1 based on the signals R1, G1 and B1. In this case also, there is not observed the stripes of different colors like the example as shown in FIG. 8B. In this example, the image is reproduced independently in every picture element indicated at C.

Figure 8D:
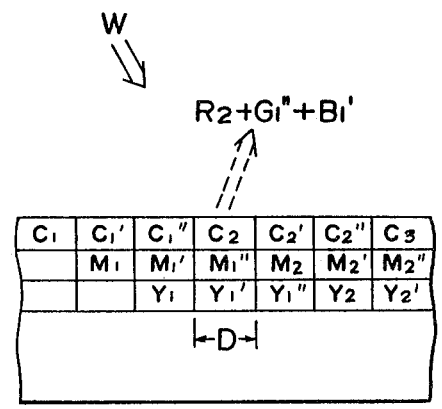

FIG. 8D shows an example in which the digital signals 52, 53 and 54 are used for recording a color image on the photosensitive material 86. In this example, at the area D all the layers are colored in C2, M1″ and Y1′ based on the digital signal levels of R2, G1″ and B1′. In this case, the boundaries between the picture elements are made unclear and a soft tone of image can be obtained.

Figure 8E:
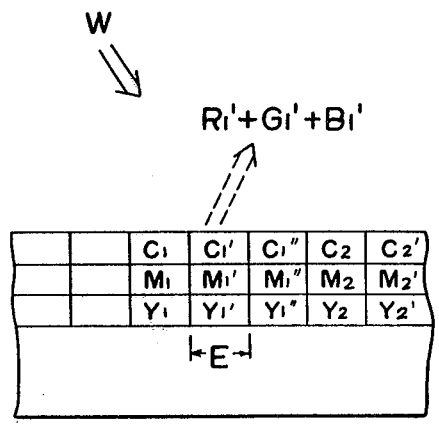

FIG. 8E shows an example in which the digital signals 55, 56 and 57 are used for recording a color image on the photosensitive material 86. In this example also, all the layers are colored at the area E in C1′, M1′ and Y1′ based on the digital signal levels of R1′, G1′ and B1′. In this case, the image quality has a characteristic between the examples shown in FIGS. 8C and 8D.

As described in detail hereinabove, the reproduced color image obtained in accordance with the present invention has high faithfulness to the original color image and high color quality reproducing the original.

It will be understood that the stripe type color filter employed in the present invention in the above embodiment can be replaced by a mosaic type color filter. Further, the micro-filter may be of C, M, Y type instead of the R, G, B type. Further, the arrangement of the three color components may not be exactly regular, but may be made random when a RAM (random access memory) is used in combination with a micro-computer to form a digital processing circuit. Furthermore, it will be understood that the direction of the primary scanning and the direction of the secondary scanning may be reversed.

I claim:

1. A method of reproducing a color image on a subtractive color photosensitive material by use of an electric signal obtained by two-dimensionally scanning an original color image in which the electric signal carries regularly and alternately contained signal components for different color components in every section of the electric signal corresponding to every picture element of the original color image, said method comprising the steps of:

analog-to-digital converting the electric signal to obtain a digital signal;

dividing said digital signal into a plurality of digital signals, one for each color component, each of said plurality of digital signals having signal sections, having color components of a given level therein, separated by at least one intervening signal section having no color component therein;

processing each of said plurality of digital signals by filling in each said at least one intervening signal section having no color component therein in accordance with at least the level of the color component in an adjacent signal section to derive at least one filled in section for each signal section, each said signal section and said at least one filled in section comprising a filled in divided signal;

digital-to-analog converting the filled in divided signals to derive respective analog signals;

modulating respective laser beams with said respective analog signals to produce respective modulation output signals;

combining said respective modulation output signals into a single output signal; and recording a color image on a subtractive color photosensitive material by two-dimensionally scanning in accordance with said single output signal.

2. A method of reproducing a color image on a subtractive color photosensitive material as claimed in claim 1, wherein said color components are red, green and blue components.

3. A method of reproducing a color image on a subtractive color photosensitive material as claimed in claim 1, wherein, during said processing step, each said at least one intervening signal section having no color component therein is filled in in accordance with the level of the color component in said adjacent signal section and the level of the color component in a further adjacent signal section immediately adjacent thereto.

4. A system for reproducing a color image on a subtractive color photo-sensitive material by use of an electric signal obtained by two-dimensionally scanning an original color image in which the electric signal carries regularly and alternately contained signal components for different color components in every section of the electric signal corresponding to every picture element of the original color image, said system comprising:

analog-to-digital converting means for converting the electric signal to obtain a digital signal;

dividing means for dividing said digital signal into a plurality of digital signals, one for each color component, each of said plurality of digital signals having signal sections, having color components of a given level therein, separated by at least one intervening signal section having no color component therein;

processing means for processing each of said plurality of digital signals by filling in each said at least one intervening signal section having no color component therein in accordance with at least the level of the color component in an adjacent signal section to derive at least one filled in section for each signal section, each said signal section and said at least one filled in section comprising a filled in divided signal;

digital-to-analog converting means for converting the filled in divided signals to derive respective analog signals;

laser beam source means for providing laser beams, one for each of said respective analog signals;

modulating means connected to said digital-to-analog converting means and to said laser beam source means for modulating respective said laser beams with said respective analog signals to produce respective modulation output signals;

combining means for combining said respective modulation output signals into a single output signal; and recording means for recording a color image on a subtractive color photo-sensitive material by two-dimensionally scanning in accordance with said single output signal.

5. The system of claim 4, wherein said processing means fills in said at least one intervening signal section having no color component therein in accordance with the level of the color component in said adjacent signal section and the level of the color component in a further adjacent signal section immediately adjacent thereto.

6. The system of claim 4, further comprising analog signal processing means connected between said digital-to-analog converting means and said modulating means for processing said respective analog signals prior to provision to said modulating means.

7. The system of claim 6, wherein said analog signal processing means comprises a log conversion circuit.

8. The system of claim 6, wherein said analog signal processing means comprises a compensation circuit.

9. The system of claim 6, wherein said analog signal processing means comprises a negative-to-positive conversion circuit.

10. The system of claim 6, wherein said analog signal processing means comprises an inverse log circuit.

11. The system of claim 4, wherein said recording means comprises a movable film, film feed drive means for moving said movable film, a rotating polygonal mirror, and rotating mirror drive means for rotatably driving said rotating polygonal mirror, said rotating polygonal mirror receiving said single output signal from said modulating means and reflecting said single output signal so as to scan said movable film as driven by said film feed drive means.

12. The system of claim 11, wherein said film feed drive means drives said movable film in a first direction, and wherein said rotating polygonal mirror rotates in such a manner as to scan said film with said single output signal in a second direction perpendicular to said first direction.

* * * * *